US008068469B2

(12) United States Patent
Chiu et al.

(10) Patent No.: US 8,068,469 B2
(45) Date of Patent: Nov. 29, 2011

(54) SURROGATE REGISTRATION IN INTERNET PROTOCOL MULTIMEDIA SUBSYSTEM FOR USERS INDIRECTLY COUPLED VIA AN END POINT

(75) Inventors: Tienyu Chiu, Naperville, IL (US); Guy J. Zenner, Northbrook, IL (US)

(73) Assignee: Alcatel Lucent, Paris (FR)

( * ) Notice: Subject to any disclaimer, the term of this patent is extended or adjusted under 35 U.S.C. 154(b) by 1003 days.

(21) Appl. No.: 11/706,483

(22) Filed: Feb. 14, 2007

(65) Prior Publication Data

US 2008/0194258 A1   Aug. 14, 2008

(51) Int. Cl.
*H04W 4/00* (2009.01)
(52) U.S. Cl. ............ 370/338; 370/352; 455/435.1; 455/445; 455/91
(58) Field of Classification Search .............. None
See application file for complete search history.

(56) References Cited

U.S. PATENT DOCUMENTS

| | | | |
|---|---|---|---|
| 2001/0026545 A1* | 10/2001 | Matsumoto et al. | 370/338 |
| 2005/0009520 A1* | 1/2005 | Herrero et al. | 455/435.1 |
| 2005/0136926 A1* | 6/2005 | Tammi et al. | 455/435.1 |
| 2006/0146792 A1* | 7/2006 | Ramachandran et al. | 370/352 |
| 2006/0229078 A1* | 10/2006 | Itzkovitz et al. | 455/445 |
| 2007/0211695 A1* | 9/2007 | Shi et al. | 370/352 |
| 2008/0003957 A1* | 1/2008 | Schwagmann et al. | 455/91 |

* cited by examiner

*Primary Examiner* — Nick Corsaro
*Assistant Examiner* — Gerald Johnson
(74) *Attorney, Agent, or Firm* — Carmen Patti Law Group, LLC

(57) ABSTRACT

An exemplary method implemented by nodes in a telecommunication network includes associating a plurality of public user identities (PUIDs) into groups where each PUID represents a user served by a group of related endpoints, such as a private branch exchange (PBX). The groups are stored at the first node. Each group contains a group address that uniquely identifies the group and the PBX associated the users with PUIDs that are associated with the group. A first registration request is transmitted from the first node to an internet protocol multimedia subsystem (IMS) where the first registration request includes the group address and the PUIDs that are associated with the group. The first registration request seeks to establish implicit registration in the IMS of the PUIDs associated with the group with the group address. A reply from the IMS is received at the first node in response to the first registration request where the reply seeks authentication for the requested implicit registration of the PUIDs. In response to receipt of the reply, authentication information is calculated and transmitted as a second registration request that contains the authentication information and the group address and the PUIDs that are associated with the group. The PUIDs in association with the group address are implicitly registered in the IMS upon a determination that the authentication information is acceptable.

16 Claims, 2 Drawing Sheets

SURROGATE REGISTRATION IN INTERNET PROTOCOL MULTIMEDIA SUBSYSTEM FOR USERS INDIRECTLY COUPLED VIA AN END POINT

BACKGROUND

This invention relates to users that are not directly coupled to an internet protocol (IP) multimedia subsystem (IMS) such as users coupled to an IMS by a private branch exchange (PBX). More specifically the invention relates to the registration of such users as subscribers of the IMS even though such users are coupled through an endpoint to the IMS. The endpoints may be a PBX, a key system or potentially a line gateway or other "line aggregator" system. Since the PBX is a common model, it is used as the example in the embodiment described below.

Advances in telephony communications provide benefits for users but sometimes present difficulties which must be overcome by telecommunication service providers. Examples of such difficulties reside in the challenges associated with the use of new equipment utilizing new technology with existing telecommunications infrastructure equipment, and challenges associated with the use of new telecommunications infrastructure equipment utilizing new technology with existing equipment. In order to take advantage of the benefits associated with integrating devices using newer technology with existing devices, compatibility and interoperability problems between devices utilizing the new technology and devices utilizing existing technology must be overcome.

Voice over internet protocol (VOIP) telephony services continue to grow. Consumers with high-speed data connections such as supported by DSL, cable modem or fiber optic lines can elect to have telephony services provided using VOIP technology over such connections. This provides an alternative to the telephony services historically provided to users by telephone companies over dedicated telephone wires. Users served by a PBX system enabled with packet based technology such as VOIP or time division multiplex (TDM) technologies benefit from the use of such technology. Although existing packet based PBX systems provide telephony services between its users and the PBX itself, existing PBX systems may not provide a mechanism whereby its users can become registered as VOIP subscribers in systems outside of the PBX. For example, users of such a VOIP PBX system are unable to take advantage of services provided by an IMS to which the VOIP PBX system is connected because the VOIP PBX does not provide a mechanism such as authentication and service-routing that are required for the PBX users to become registered VOIP subscribers of the IMS. Some services offered by the IMS are made available only to subscribers that are registered with the IMS. This prevents users of such a PBX from obtaining telecommunications services provided via the IMS where registration with the IMS is a prerequisite. There is a need for solution to this problem.

SUMMARY

It is an object of the present invention to satisfy this need.

An exemplary method implemented by nodes in a telecommunication network includes associating a plurality of public user identities (PUIDs) into groups where each PUID represents a user served by a private branch exchange (PBX). The groups are stored at the first node. Each group contains a group address that uniquely identifies the group and the PBX associated, and the users with PUIDs that are associated with the group. A first registration request is transmitted from the first node to an internet protocol multimedia subsystem (IMS) where the first registration request includes the group address and the PUIDs that are associated with the group. The first registration request seeks to establish implicit registration in the IMS of the PUIDs associated with the group with the group address. A reply from the IMS is received at the first node in response to the first registration request where the reply seeks an authentication credential from the group address that is performing the registration on behalf of other PUIDs in the surrogate registration group. In response to receipt of the reply, authentication information is calculated and transmitted as a second registration request that contains the authentication credential and the group address. The PUIDs in association with the group address are implicitly registered in the IMS upon a determination that the credential provided in the registration request matches the authentication information pre-provisioned in the IMS service profile.

A telecommunication apparatus that implements the surrogate registration method is also an embodiment of the present invention.

DESCRIPTION OF THE DRAWINGS

Features of exemplary implementations of the invention will become apparent from the description, the claims, and the accompanying drawings in which:

DETAILED DESCRIPTION

Figure 1:
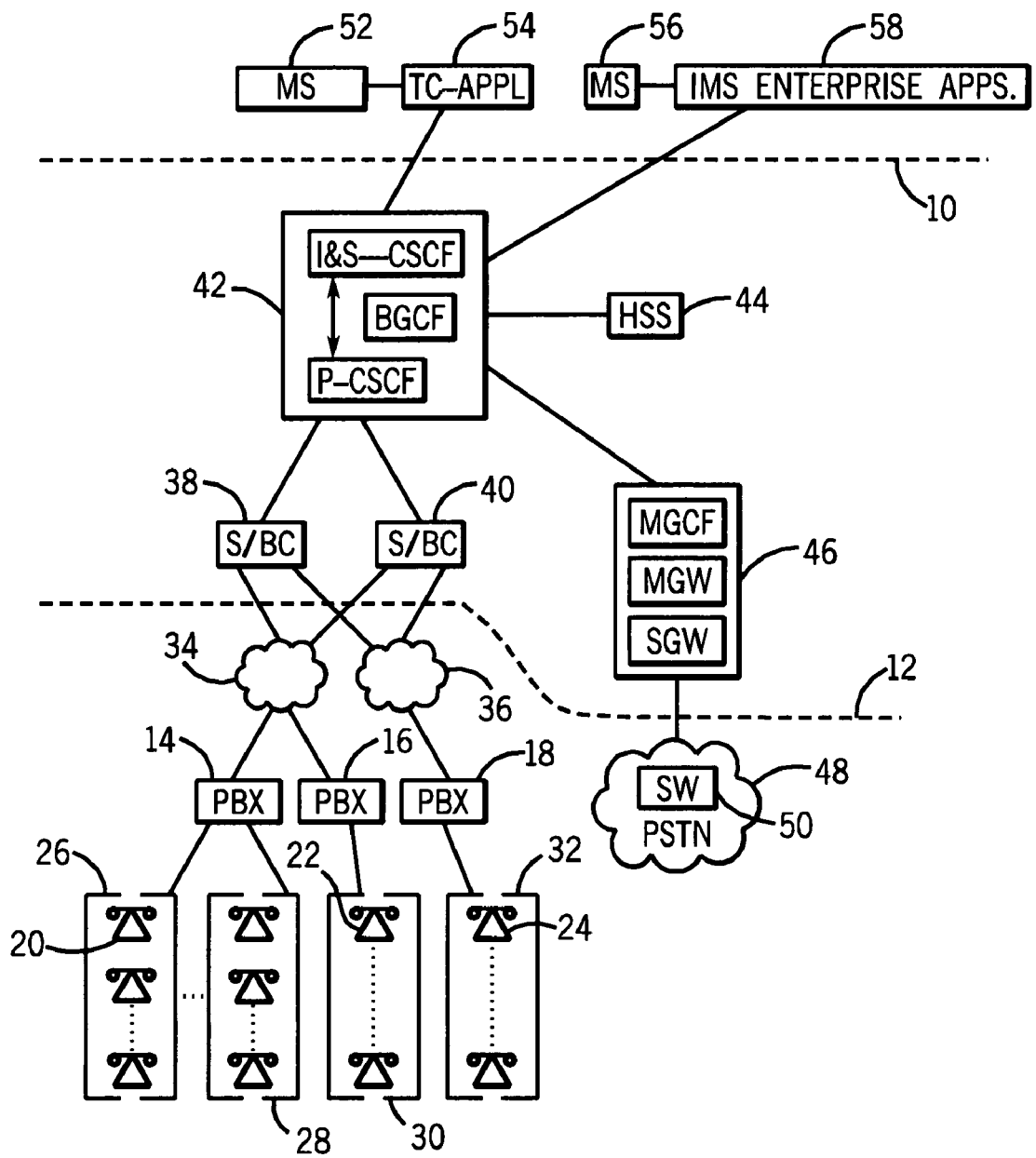
FIG. 1 is a block diagram of an illustrative telecommunications system suited for incorporation of an embodiment of the present invention.

FIG. 1 is a block diagram of a telecommunication system suited for incorporation of an embodiment of the present invention. The elements in the block diagram above line 10 support application layer functionality, elements in the block diagram below line 12 provide access layer functionality, and elements in the block diagram between lines 10 and 12 provide network layer functionality. Illustrative PBXs 14, 16 and 18 are VOIP enabled with each supporting a plurality of users with respective VOIP telephones represented by exemplary telephones 20, 22 and 24. The telephones supported by PBX 14 are segregated into groups represented by illustrative groups 26 and 28. Similarly, telephones supported by PBXs 16 and 18 are also segregated into groups represented by illustrative groups 30 and 32, respectively. As will be explained in more detail below, the segregation of these PBX supported telephones into logical groups facilitates the surrogate registration of the telephones in an IMS system utilizing implicit registration in the IMS system.

Communication transmission networks 34 and 36 support bidirectional communications between the PBXs 14, 16 and 18, and the session border controllers (S/BC) 38 and 40, also known as border elements, such as the Session Directors available from the Acme Packet Corp. The S/BCs 38 and 40 function as an intelligent network node and assist in performing the surrogate registrations on behalf of the users 20, 22 and 24. Although S/BCs are used herein as an example, any form of a surrogate registration advocate component could be used. The S/BCs 38 and 40 are connected to a session manager 42 that provides known call control functions including interrogating-call session control functions (I-CSCF), proxy call session control functions (P-CSCF), serving call session control functions (S-CSCF) and breakout gateway control functions (BGCF). The session manager 42 is coupled to a home subscriber server (HSS) 44 which provides service profiles and manages authentication and registration status of users. For IMS subscribers, the HSS stores public user identities (PUID) associated with each user.

The session manager 42 is also coupled to the interface node 46 which supports a plurality of functions including a media gateway (MGW), a media gateway control function (MGCF), and signaling gateway (SGW). The interface node 46 is coupled to the public switched telephone network (PSTN) 48 that includes an exemplary telecommunication switch 50. The node 46 serves as an interface between signals and protocols utilized by the PSTN 48, and the signals and protocols utilized by the core IMS.

An illustrative core IMS can be considered to include the session manager 42, HSS 44, and the interfacing node 46. This core IMS is capable of providing services beyond basic voice communications for its registered subscribers. In this illustrative system certain additional services are provided by the core IMS by interaction with service nodes in the application layer. For example, Teleconferencing (TC) services are supported by TC applications 54 in conjunction with a media server 52. The TC application server 54 is coupled to the session manager 42. Similarly, various business VOIP (ENTERPRISE APPLICATIONS) applications provide services, e.g. IP Centrex, IP Call Center, to business subscribers in conjunction with a media server 56. The Business VoIP application servers 58 are coupled to the session manager 42.

With the communication system having been described, an overview of the illustrative surrogate registration technique of the present invention is provided in order to assist in understanding the detailed method explained below. IP PBXs such as SIP PBXs, H.323 PBXs and TDM PBXs such as PRI PBXs, PRA PBXs fail to support the steps/actions required complete an IMS registration for a user of such PBXs. For example, such PBXs do not support the required authentication steps associated with initial, first-time, IMS registration of a user. Without the use of surrogate registration, the PBX users are treated as not being subscribers of the IMS and hence cannot receive services from the IMS network.

The session border controllers help to perform the surrogate registrations on behalf of the users, which are located behind the PBXs from the perspective of the core IMS. The PBX users are divided into multiple registration groups. A pseudo PUID such as in SIP URI format is assigned to each registration group. The session border controller then uses the pseudo PUID to perform the surrogate registration for users in the group associated with the pseudo PUID with the core IMS network using an implicit registration capability of the IMS network. The session border controller supports the IMS registration procedures, e.g. is able to respond to authentication challenges and maintain associations among the PBXs, surrogate registration groups and public user identities. This function could be performed by a session border controller or other component capable of performing this registration.

Multiple session border controllers with different contact addresses can perform the surrogate registration for the same group of users that belong to the same PBX to increase overall network reliability and availability such as in the case where one session border controller is not reachable. Thus the multiple session border controllers can handle traffic to and from the same PBX. The session border controller that performs a last surrogate registration will handle calls initiated from the users that belong to that surrogate registration group. For calls terminating to users in that surrogate registration group, the P-CSCF can use a domain name service (DNS Server) (not shown) coupled to the IMS to resolve multiple IP addresses of session border controllers. The P-CSCF can select another session border controller should the primary session border controller be not reachable. Alternatively, the selection of the session border controller to be utilized can be done in a round robin fashion or based on predetermined priorities.

| Illustrative Registration Address Table | | |
|---|---|---|
| Surrogate Registration Group | Private User ID | Implicit Registration Set |
| PBX14Group26 | pbx14grp26 | PUID1: sip:pbx14grp26@bvoip.telco.com, PUID2, PUID3, PUID4, PUID5, PUID6, PUID7, PUID8, PUID9, PUID10 |
| PBX16Group30 | pbx16grp30 | PUID11: sip:pbx16grp30@bvoip.telco.com, PUID12, PUID13, PUID14, PUID15, PUID16, PUID17, PUID18, PUID19, PUID20 |
| . | . | . |
| . | . | . |
| . | . | . |

The above Table shows an illustrative relationship among the registration groups, the associated private user identification for each group, and an implicit set of registration identifications for the group. In this example each registration set includes 10 identifications with the first identification in the set representing a group level PUID and the other nine PUIDs associated with nine respective users. The identification associated with the group level PUID, e.g. PUID1, includes a session initiation protocol (SIP) address, e.g. "pbx14grp26@bvoip.telco.com", that identifies a specific PBX and group associated with a domain address "bvoip.telco.com" where this identifies a specific telecommunication service provider, e.g. "telco.com", and indicates that VOIP business services, e.g. "bvoip", are to be provided by the business services application server by the IMS.

The nine PUIDs, after a successful surrogate registration process, are associated respectively with nine PBX users and are used to originate calls by the IMS and terminate calls to the respective user by the IMS. As will be explained in more detail below, the nine PUIDs associated with individual users are implicitly registered together with the associated group level PUID during the IMS registration process. That is, each of the nine individual users will share the same contact address associated with the group level PUID as part of the implicit registration. This provides the individual users with a registered identity that identifies each in the IMS and thereby provides access to IMS services for such registered users.

Figure 2:
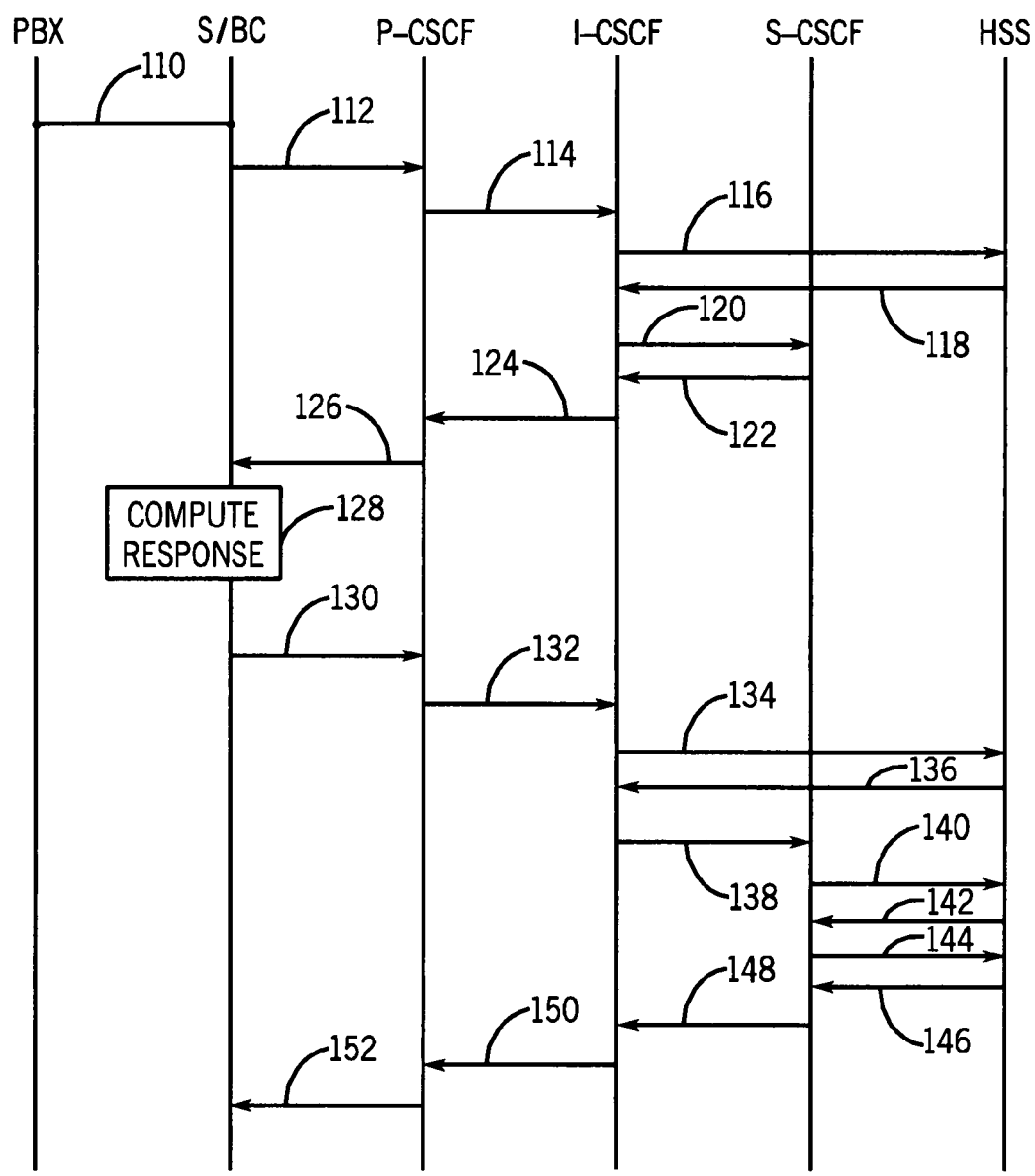
FIG. 2 is a signal flow diagram of an illustrative method of the present invention by which users of a packet based PBX can become registered subscribers of an external IMS.

FIG. 2 shows an illustrative flow diagram of an exemplary surrogate registration process. Each of the vertical lines is associated with an element in FIG. 1 as indicated by the respective label. In this example, it will be assumed that PBX 14 and S/BC 38 are utilized in registering PBX users 20 associated with group 26. Prior to the described registration process, the session border controller 38 will have been updated with relevant communication information about PBX 14 including communication channels to be utilized, address identity of the PBX, and individual user identities to be associated with each group. Also the S/BC will have been configured with the identity/address of the P-CSCF to which a request for registration is to be sent.

The linked relationship between PBX 14 and the S/BC 38 is represented by the connecting line 110. The S/BC 38 constructs and sends an SIP REGISTER message to the P-CSCF to initiate the surrogate registration in step 112. Both the From and To headers of the REGISTER message contain the group PUID that is assigned to the selected surrogate registration group 26. The Contact header contains the contact address of the S/BC that represents this registration group. The P-CSCF creates a P-Charging-Vector header and sends the registration request to the I-CSCF in step 114. In step 116 the I-CSCF communicates with the HSS to obtain/determine the appropriate S-CSCF for registration. The PUID associated with the surrogate registration group will not be barred in the service profile contained in the HSS. In step 118 the HSS transmits a reply to the I-CSCF identifying the S-CSCF to be utilized. The I-CSCF forwards the registration request to the designated S-CSCF in step 120. The S-CSCF recognizes this transmission as a request for initial registration. However, a 200 OK confirmation/authorization cannot be sent back until the S-CSCF receives a correct authentication challenge response to the registration request. So the S-CSCF initiates a challenge by generating a 401 (Unauthorized) reply, including a WWW-Authenticate header which transports realm, nonce and authentication algorithm/parameters, in response to the registration request and transmits the reply to the I-CSCF in step 122. This transmission is relayed by I-CSCF to the P-CSCF in step 124 and to the S/BC in step 126. Upon receipt of this reply, the S/BC computes a response to the challenge as indicated at step 128.

The S/BC retransmits the registration request to the P-CSCF in step 130. However, this transmission includes an authorization header which includes the user name, nonce, response and cnonce. This registration request along with the computed authentication credentials will be proxied thru the P-CSCF, I-CSCF, then the same S-CSCF as indicated by steps 132, 134, 136 and 138. The S-CSCF identifies the S/BC by the public user identity as received in the To header and the private user identity received in the user name field in the authorization header of the registration request. The S-CSCF communicates with the HSS via Multimedia Authentication Request (MAR)/Multimedia Authentication Answer (MAA) to obtain the authentication vector as indicated in steps 140 and 142. The S-CSCF then checks the received authentication challenge response to see if the challenge response received from the S/BC and the expected response calculated by the S-CSCF match.

Assuming that these match, i.e. the authentication challenge has been satisfied, the S-CSCF transmits a Server Assignment Request to the HSS in step 144 indicating that the user, i.e. the PUID associated with the surrogate registration group, currently being registered will be served by the S-CSCF by passing its SIP URI to the HSS. The HSS uses the implicit registration set to update the registration status for all of the PUIDs that belong to this implicit registration set. This enables the HSS to direct all subsequent incoming initial requests for a dialog or stand alone transactions destined for the PUIDs to this identified S-CSCF. The service profiles associated with all of the PUIDs that belong to this implicit registration set are then downloaded to the S-CSCF via the Server Assignment Answer response as indicated in step 146.

The Server Assignment Answer response contains the list of public user identities associated with the PUID that it is registering, including the public user identity under registration and the implicitly registered PUIDs due to the received registration request. The S-CSCF then extracts and stores all of the service profiles corresponding to the public user identities being implicitly registered, including initial filter criteria. These PUIDs may be assigned with different service profiles. The S-CSCF also caches the registered contact information including all header parameters contained in the contact debtor and all associated URI parameters for the registered PUIDs. The S-CSCF uses the icid parameter received in the P-Charging-Vector header to generate the billing events/records. The S-CSCF determines the duration of the registration by checking the value of the Expires header in the received register request. The S-CSCF may reduce the duration of the registration if desired due to local policy.

In step 148 a 200 OK response to the register request is transmitted from the S-CSCF to the I-CSCF which in turn transmits the response in step 150 to P-CSCF. The P-CSCF processes the 200 OK response and caches the registration status for the PUIDs contained in the P-Associated-URI header. The surrogate registration process is completed upon the S/BC receiving the 200 OK reply from the P-CSCF in step 152.

The surrogate registration process should be completed for each of the groups of users for all of the PBXs. Once this process has been completed, each of the PBX users will have a valid registration with the IMS and will hence be treated as registered subscribers of the IMS thereby permitting such users to access services, e.g. business VOIP services, offered by the IMS.

Although exemplary implementations of the invention have been depicted and described in detail herein, it will be apparent to those skilled in the art that various modifications, additions, substitutions, and the like can be made without departing from the spirit of the invention. For example, the surrogate registration functionality described as implemented by the session border controllers could alternatively be implemented as part of a P-CSCF in the core IMS or by a new registration agent to solve the IMS registration issue for PBX users. The various functionality shown associated with specific nodes may be incorporated into other nodes as well as integrating two or more nodes together. The illustrative method contains various steps that may be, if practical, implemented in a different order or may be eliminated if the information or commands associated with such steps is already known or is differently acquired.

The scope of the invention is defined in the following claims.

We claim:

1. A method implemented by a first node in a telecommunication network for registering user communication devices coupled through an end point to an internet protocol multimedia subsystem (IMS) network, comprising the steps of:

associating a plurality of public user identities (PUIDs) into groups where each PUID represents a different user's communication device served by the end point and storing the groups, where each group contains a group address that uniquely identifies the group and the end point associated with the users and the PUIDs that are associated with the group, where the first node is coupled to the end point and the IMS, the end point coupled in series between the first node and user communication devices, and the first node coupled in series between the end point and the IMS network such that registration associated signaling messages from the IMS network to the user communication devices are required to pass through the first node and end point to reach the user communication devices, the end point preventing the passage of registration associated signaling messages between the IMS network and the user communication devices even though the IMS network, first node, and end point as well as user communication devices support internet protocol packet-based communications;

transmitting to the IMS a first registration request where the first registration request includes the group address and the PUIDs that are associated with the group, the first registration request seeking to establish implicit registration in the IMS of the PUIDs associated with the group with the group address;

receiving a reply from the IMS in response to the first registration request where the reply seeks authentication for the requested implicit registration of the PUIDs;

calculating, in response to receipt of the reply, authentication information and transmitting to the IMS a second registration request that contains the authentication information and the group address and the PUIDs that are associated with the group;

thereby implicitly registering the PUIDs in association with the group address in the IMS upon a determination that the authentication information is acceptable.

2. The method of claim 1 wherein the first node comprises a surrogate registration advocate component.

3. The method of claim 1 wherein the end point is a private branch exchange.

4. The method of claim 1 wherein the step of calculating the authentication information is performed by the first node independent of any further information from the end point.

5. A first node in a telecommunication network for registering user communication devices coupled through an end point to an internet protocol multimedia subsystem (IMS) network comprising:

means for associating a plurality of public user identities (PUIDs) into groups where each PUID represents a different user's communication device served by the end point and storing the groups, where each group contains a group address that uniquely identifies the group and the end point associated with the users and the PUIDs that are associated with the group, where the first node is coupled to the end point and the IMS, the end point coupled in series between the first node and user communication devices, and the first node coupled in series between the end point and the IMS network such that registration associated signaling messages from the IMS network to the user communication devices are required to pass through first node and the end point to reach the user communication devices, the end point preventing the passage of registration associated signaling messages between the IMS network and the user communication devices even though the IMS network, first node, and end point as well as user communication devices support internet protocol packet-based communications;

means for transmitting to the IMS a first registration request where the first registration request includes the group address and the PUIDs that are associated with the group, the first registration request seeking to establish implicit registration in the IMS of the PUIDs associated with the group with the group address;

means for receiving a reply from the IMS in response to the first registration request where the reply seeks authentication for the requested implicit registration of the PUIDs;

means for calculating, in response to receipt of the reply, authentication information and transmitting to the IMS a second registration request that contains the authentication information and the group address and the PUIDs that are associated with the group;

thereby implicitly registering the PUIDs in association with the group address in the IMS upon a determination that the authentication information is acceptable.

6. The first node of claim 5 wherein the first node comprises a surrogate registration advocate controller.

7. The first node of claim 5 wherein the end point is a private branch exchange.

8. The first node of claim 5 wherein the means for calculating the authentication information performs the calculation independent of any further information from the end point.

9. The method of claim 1 wherein an intermediate node is connected in series between the first node and the end point, the intermediate node blocking a response to the reply from the IMS seeking authentication for the requested implicit registration, the intermediate node preventing the end points from directly registering with the IMS even though the intermediate node supports internet protocol packet-based communications.

10. The method of claim 3 wherein an intermediate node is connected in series between the first node and the end point so that signaling messages with the end point must travel through the intermediate node, the intermediate node blocking a response by the end point to the reply from the IMS seeking authentication for the requested implicit registration, the intermediate node preventing the end points themselves from registering with the IMS even though the intermediate node supports internet protocol packet-based communications.

11. The first node of claim 5 wherein an intermediate node is connected in series between the first node and the end point, the intermediate node blocking a response to the reply from the IMS seeking authentication for the requested implicit registration, the intermediate node preventing the end points from directly registering with the IMS even though the intermediate node supports internet protocol packet-based communications.

12. The first node of claim 7 wherein an intermediate node is connected in series between the first node and the end point so that signaling messages with the end point must travel through the intermediate node, the intermediate node blocking a response by the end point to the reply from the IMS seeking authentication for the requested implicit registration, the intermediate node preventing the end points themselves from registering with the IMS even though the intermediate node supports internet protocol packet-based communications.

13. The method of claim 1 wherein the first registration request transmitted to the IMS is generated by and originated from the first node.

14. The first node of claim 5 wherein the first node generates and originates the first registration request transmitted to IMS.

15. The method of claim 1 wherein an internet protocol packet-based communication transmitted from a first user communication device having the IMS network as a destination traverses in sequence from the end point to the first node, and then from the first node to the IMS network.

16. The first node of claim 5 wherein an internet protocol packet-based communication transmitted from a first user communication device having the IMS network as a destination traverses in sequence from the end point to the first node, and then from the first node to the IMS network.

* * * * *

UNITED STATES PATENT AND TRADEMARK OFFICE
Certificate

Patent No. 8,068,469 B2                                      Patented: November 29, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Tienyu Chiu, Naperville, IL (US); Guy J. Zenner, Northbrook, IL (US); Min Lu, Holmdel, NJ (US); Martin Dolly, Forked River, NJ (US); Saul Fishman, Highland Park, NJ (US); Gerald Hoover, Red Bank, NJ (US); Mark Ratcliffe, Oakhurst, NJ (US); Canby Dautel, Jr., Framingham, MA (US); Hadriel Kaplan, Nashua, NH (US); and Nathan Thomas Denbow, Sandwich, MA (US).

Signed and Sealed this Twenty-ninth Day of October 2013.

*STEVEN S. PAIK*
*Supervisory Patent Examiner*
*Art Unit 2887*
*Technology Center 2800*

UNITED STATES PATENT AND TRADEMARK OFFICE
Certificate

Patent No. 8,068,469 B2                                                                                    Patented: November 29, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Tienyu Chiu, Naperville, IL (US); Guy J. Zenner, Northbrook, IL (US); Min Lu, Holmdel, NJ (US); Martin Dolly, Forked River, NJ (US); Saul Fishman, Highland Park, NJ (US); Gerald Hoover, Red Bank, NJ (US); Mark Ratcliffe, Oakhurst, NJ (US); Canby Dautel, Jr., Framingham, MA (US); Hadriel Kaplan, Nashua, NH (US); and Nathan Thomas Denbow, Sandwich, MA (US).

Signed and Sealed this Twenty-sixth Day of November 2013.

<div style="text-align:right">

DWAYNE BOST
*Supervisory Patent Examiner*
Art Unit 2699
Technology Center 2600

</div>